July 3, 1945.          C. V. LITTON          2,379,584
METHOD OF MAKING SEAL MEMBERS
Filed Jan. 31, 1942                    2 Sheets-Sheet 1

INVENTOR.
CHARLES V. LITTON
BY
*D. Gordon Angus*
ATTORNEY.

July 3, 1945.　　　　C. V. LITTON　　　　2,379,584
METHOD OF MAKING SEAL MEMBERS
Filed Jan. 31, 1942　　　2 Sheets-Sheet 2

INVENTOR.
CHARLES V. LITTON
BY D. Gordon Angus
ATTORNEY.

Patented July 3, 1945

2,379,584

UNITED STATES PATENT OFFICE 2,379,584

METHOD OF MAKING SEAL MEMBERS

Charles V. Litton, Redwood City, Calif., assignor to International Standard Electric Corporation, New York, N. Y., a corporation of Delaware Application January 31, 1942, Serial No. 429,073

10 Claims. (Cl. 29—148)

This invention relates to a method of making metallic seal members of a type useful in glass-to-metal seals of vacuum tubes.

The object is to provide a simple method for fabricating the metal members of the seals with a shape which is well suited for sealing with glass to form a strong seal.

In the manufacture of vacuum tubes of which the walls are composed of metallic sections in addition to vitreous or glass sections, the vitreous sections are sealed to the metal sections, as is well known, forming a vacuum tight joint. In order to minimize the danger of cracking of the glass owing to thermal changes, care must be taken to form the metal member so that the strains are minimized. For this purpose, it has been customary to provide the metal member with thin flanges to which the glass is to be sealed, so that when the glass contracts, the thin flange can deform without creating sufficient stress to break the glass. The formation of the thin flanges can be done by turning down the metal member in a lathe so as to leave the desired thin or feathered edge integral with the member.

This turning method of forming the seal member has the disadvantage of being very laborious and expensive, and is not especially well adapted to forming the seal edge into especially desirable shapes. In accordance with this invention, there is used a rolling process which does not require any turning. A laminar annulus is sheared along the edge of a metallic disc shaped blank and turned over, so that it extends substantially perpendicularly from the side of the blank, and the turned over lamination is then rolled down into a desired shape. This avoids any requirement for turning the metal and has the advantage of creating a fine, crystalline structure by the cold rolling process, so that the edge portions of the sealing flanges are made especially impervious to gas.

The process will be understood from the following detailed description taken in connection with the accompanying drawing, of which Fig. 1 is a side view of a blank disc which is to be fabricated into a seal member in accordance with this invention;

Figure 1:
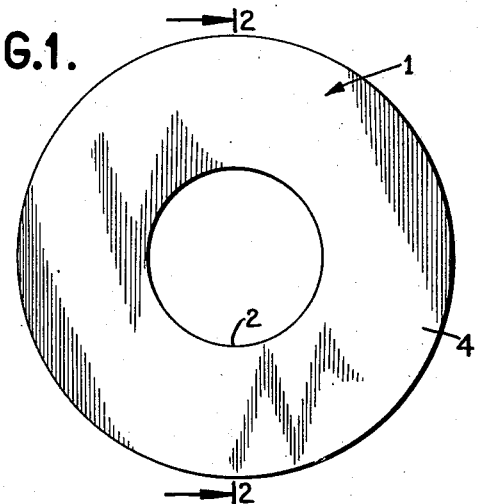
Figure 2:
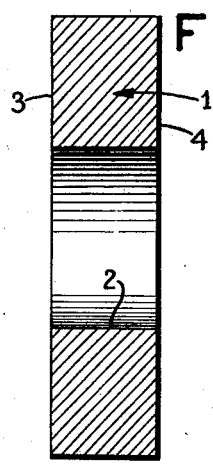
Fig. 2 is a cross section view of the blank, taken at line 2—2 of Fig. 1.
Figure 3:
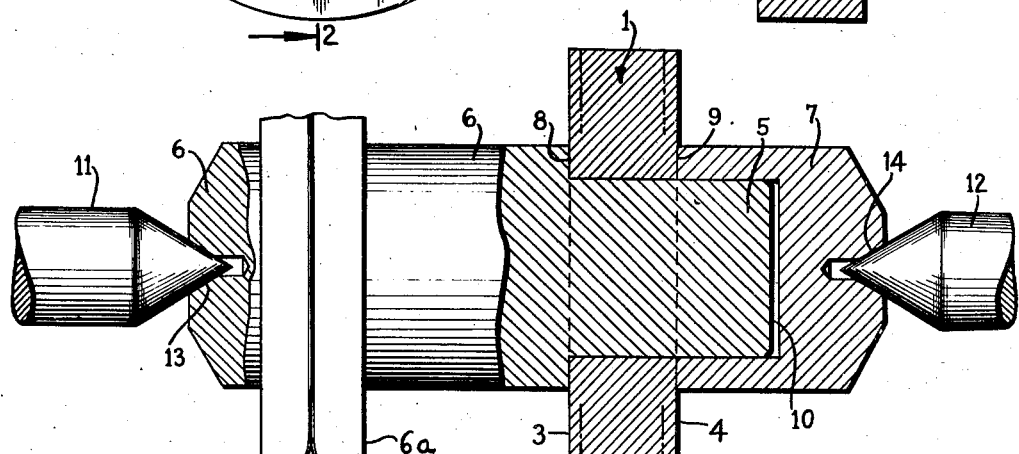
Fig. 3 illustrates a step of shearing a laminar annulus at each face of the blank of Figs. 1 and 2.
Figure 4:
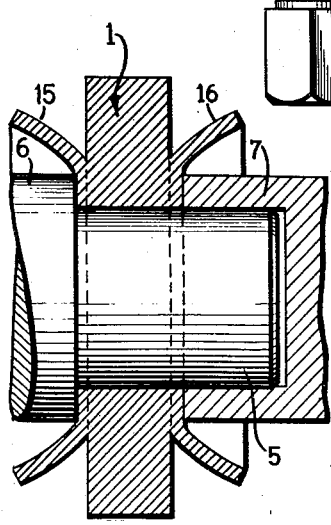
Figs. 4 and 5 illustrates the flattening down of the laminations formed according to Fig. 3.

Figs. 1 and 2 show a disc 1, which may be of copper, having a hole 2 drilled centrally through it of the diameter which it is intended the innermost surface of the seal member shall have. The two faces 3 and 4, and also the surface of the hole 2, are preferably machined. The disc 1 is placed on mandrel member 6, with the neck 5 of the mandrel through the hole 2, and a cooperating mandrel member 7 is brought up against the opposite face 4 of the disc so that the disc is firmly held between the faces 8 and 9 of the mandrels. Mandrel 7 is hollowed out to form a coaxial cylinder 10 into which the cylindrical neck 5 fits. The mandrel members 6 and 7 are carried by the lathe tail shafts 11 and 12 having conical points 13 and 14 respectively which fit into corresponding conical re-entrant portions of the mandrels. Member 6a is the collar fastened to mandrel member 6 for applying the driving torque of the lathe in a well-known manner. Laminar annuli 15 and 16 are then sheared or split along the faces 3 and 4 of the disc as illustrated in Fig. 4. This may be done in one operation by the use of a splitting tool which may consist of a pair of hardened and ground steel rollers 17 and 18 (Fig. 3) having sharp, tapered cutting edges 19 and 20 respectively. This pair of cutting rollers may be mounted in a well-known manner on the tool post of the lathe and adjusted so that the faces 21 and 22 of the cutting portions are alined with each other and parallel with the disc surface 3 and 4 along which the lamination is to be sheared. The axes 23 and 24 of the cutting rollers may be placed at an angle of about 45 degrees to give the desired adjustment of the faces 21 and 22. Thus, when the lathe shafts 11 and 12 are rotated to rotate the disc 1, the cutting edges pressing against the disc split off the laminations 15 and 16 (Fig. 4) almost down to the outside diameter of mandrels 6 and 7.

Figure 5:
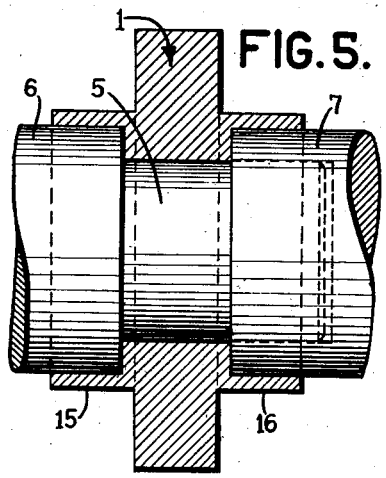
Figure 6:
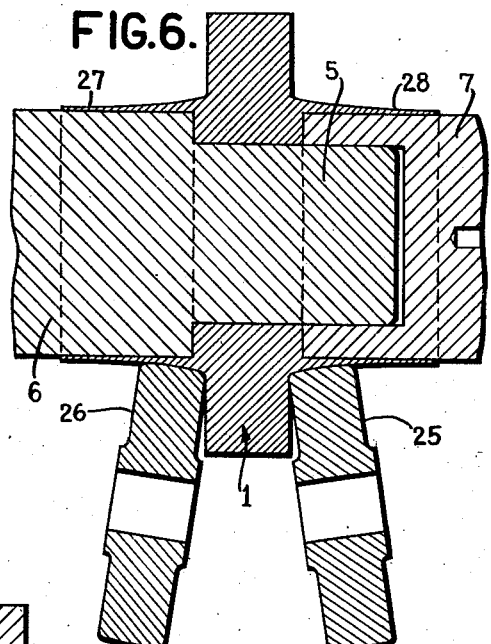
Fig. 6 shows the step of rolling out the laminations which have been flattened as shown in Fig. 5.
Figure 7:
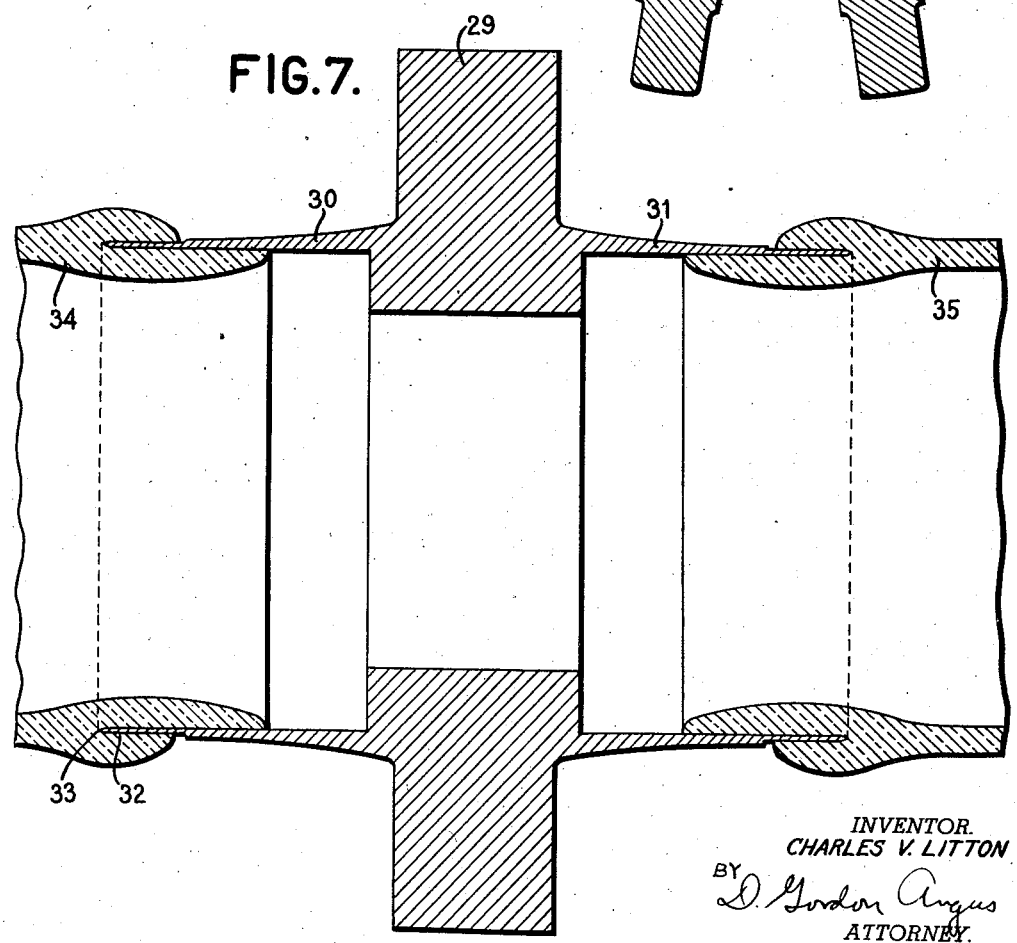
Fig. 7 is an enlarged sectional view of a seal member rolled into a special shape and sealed to glass sections.

The laminations 15 and 16 are then bent and somewhat flattened down on the mandrel surfaces as much as possible, as shown in Fig. 5, and are rolled as shown in Fig. 6 by means of rollers 25 and 26 which may be placed in the tool post. By reason of this rolling, the length of the lamination, or sleeve, is extended and should be tapered somewhat in the form of 27 and 28 (Fig. 6). Any desired formation or degree of taper can be provided by manipulation and use of the rollers, and there is thus formed a seal member of a form shown in Fig. 7, having a strong central portion 29 and relatively long cylindrical collar members 30 and 31, which taper down to a thin area adjacent to the edge at 32 which is well suited for sealing to glass. The thin edges of 32 will ordinarily be made much thinner than as actually shown in Fig. 7, wherein the thickness has been exaggerated for purpose of illustration. The edges may be finished by a suitable cutting means to form sharp edges 33 of any desired angle, such as 45°, which is a shape well suited for sealing with the glass. Proportions for the seal member which are especially advantageous are described and claimed in my copending application Ser. No. 429,072, filed January 31, 1942, now Patent No. 2,336,488. A cylindrical glass section 34 may then be sealed to collar member 30 and another glass section 35 may be sealed to the collar member 31 in a well-known manner.

The cold rolling of the split-off sleeves or collar members 30 and 31 has the great advantage over the laborious alternative process of turning down a massive cylinder to the same shape, of saving the large mass of the metal which would otherwise become waste by the turning, and of eliminating the corresponding heavy wear on the turning tool. The cold rolling has the further great advantage over a turning process of breaking down the crystal sizes in the sleeve, which is a great advantage in vacuum tube seals. Copper blanks to be made into seals are customarily annealed before being fabricated into the seals, and the annealing process produces large crystals which might very well extend all the way across the thickness of the thin sleeves 30 and 31. Gas seepage might consequently occur past the cleavages of such large crystals which would deleteriously affect the vacuum tube operation. The cold rolling of the sleeves breaks down such large crystals into much smaller crystals, such that gas seepage through the sleeve does not occur. The crystal size should be no greater than one-half the thickness of the sleeve, and is preferably of the order of one-tenth or even less, of the sleeve thickness. Such a fine crystalline structure is provided by the cold rolling which can produce crystals of the order of .0025 to .0035 millimeter in diameter or length.

What is claimed is:

1. The method of making a seal member which comprises binding a metallic disc having a centrally located hole therein, between two mandrel members having cylindrical outer surfaces of a diameter greater than that of said hole and less than the outside diameter of said disc, shearing a lamination parallel to a face of the disc, from the outside circumference of the disc, down substantially to the diameter of said mandrel, turning over the sheared lamination on to the mandrel, and then rolling the turned over lamination on the circumference of the mandrel to form a tapered margin.

2. The method of making a seal member which comprises binding a metallic disc having a central hole therein, between two mandrel members having cylindrical outer surfaces of a diameter greater than that of said hole and less than the outside diameter of said disc, shearing a lamination parallel to a face of the disc, from the outside circumference of the disc, down substantially to the diameter of said mandrel turning over the sheared lamination on to the mandrel, then rolling the turned over lamination on the circumference of the mandrel to form a tapered margin, and cutting off the extreme rolled edge of the margin to form an edge at an angle of about 45 degrees.

3. The method of making a seal member useful for vacuum tubes which comprises making a hole through a disc, shearing a lamination from the outer circumference part way to the hole, turning over the sheared lamination against a mandrel, and then rolling the turned over lamination between a mandrel member and a rolling tool to form a sleeve extending from the body of the disc and to reduce by said rolling operation the sizes of the crystals in the sleeve to less than one-half the sleeve thickness.

4. The method of making a substantially symmetrical tubular seal having a thick mid section and relatively thin tubular end portions suitable for forming gas-tight sealed connections to two tubular vitreous portions of a vacuum tube envelope, which comprises securing a metallic disc having a central hole therein between two coaxial mandrel members having cylindrical outer surfaces of a diameter greater than that of said hole and less than the outside diameter of said disc, shearing flanges from said disc near opposite faces thereof from the outside circumference of the disc down substantially to the diameter of the respective mandrel members, then turning the flanges over on said mandrel members, and thereafter forming said flanges into tapered tubular sleeves having thin outer margins suitable for said seal connection by applying rolling pressure to the outer surfaces of the flanges.

5. The method set forth in claim 4, in which the flanges are sheared simultaneously.

6. The method of making a seal member having a tapered margin suitable for sealing to a vitreous portion of a vacuum tube envelope which comprises mounting a disk having a central hole on a mandrel having a substantially cylindrical face adjacent one side of the disk, cutting a radial annular incision in the disk to form an annular flange at said side, forcing the flange against the mandrel to form a substantially cylindrical sleeve, and tapering the sleeve to a thin edge suitable for hermetic sealing to said vitreous portion by applying rolling pressure to the sleeve against the mandrel.

7. The method set forth in claim 6, in which the rolling pressure is applied by rolling means traveling circumferentially around the tubular sleeve and the mandrel axis.

8. The method set forth in claim 6, in which the disk is formed of a metal having crystals whose maximum dimensions are substantially greater than half of the desired thickness of the outer marginal portion of the sleeve and the rolling pressure is maintained until said crystals are reformed into relatively small crystals having maximum dimensions substantially less than half of the thickness of the outer marginal portion of the sleeve.

9. The method set forth in claim 6, in which the outer edge of the sleeve is cut off at an angle of about 45 degrees.

10. The method of making a seal member useful for vacuum tubes which comprises making a hole through a disc, shearing a lamination from the outer circumference part way to the hole, turning over the sheared lamination against a mandrel, and then rolling between a mandrel member and a rolling tool the turned over lamination by substantial radial pressure to form a sleeve of tapered thickness extending from the body of the disc.

CHARLES V. LITTON.